United States Patent [19]

Butler, Jr.

[11] 4,004,427
[45] Jan. 25, 1977

[54] ENERGY CONVERSION SYSTEM

[76] Inventor: Tony W. Butler, Jr., 3224 Timmons Lane, No. 136, Houston, Tex. 77027

[22] Filed: Aug. 28, 1975

[21] Appl. No.: 608,678

[52] U.S. Cl. .................................. 60/698; 60/641; 62/467 R; 52/173 R; 60/398
[51] Int. Cl.² ........................................... F03G 7/02
[58] Field of Search ............ 60/641, 698, 398, 650, 60/682; 52/173; 62/467; 237/1 A

[56] References Cited
UNITED STATES PATENTS

| | | | |
|---|---|---|---|
| 2,270,537 | 1/1942 | Ludington | 52/24 X |
| 3,832,853 | 9/1974 | Butler, Jr. | 60/641 |
| 3,866,363 | 2/1975 | King | 52/173 X |

Primary Examiner—Allen M. Ostrager

[57] ABSTRACT

An energy conversion system is associated with an edifice for converting natural energy to usable energy. The edifice has a generally vertical outwardly facing side surface, and the system includes radiation collecting means defining a plurality of radiation receiving surfaces adjacent to but spaced from the edifice side surface. Thus, a flow-way is defined between the radiation receiving surfaces and the side surface of the edifice. Each of the radiation receiving surfaces faces generally upwardly and has a plurality of hollows. The system further comprises a rotor rotatably mounted on the edifice above the radiation receiving surfaces and ducting apparatus for directing a gaseous medium, such as air, from the flowway to the rotor to rotate the latter. The rotation of the rotor in turn drives at least a part of a suitable energy-using first operator means. The system may also comprise wind driven means comprising braced web members operatively connected to a second operator means.

33 Claims, 8 Drawing Figures fig.1 fig.4 fig.5 fig.2 fig.3 fig.6 fig.7 fig. 8

ENERGY CONVERSION SYSTEM

BACKGROUND OF THE INVENTION

1. Field of the Invention

The present invention pertains generally to systems for converting naturally occurring forms of energy, such as solar radiation and wind, to useful potential or kinetic energy. During relatively recent times, technology of all types has developed at a tremendous rate, and, with this technological development, there has been a corresponding increase in energy needs. These increases are particularly impressive when it is realized that the past one hundred to two hundred years represent only a very small fraction of the time which has elapsed since the appearance of man on earth and an even smaller fraction of the life of the earth itself. Yet the technological advances and energy usage during this short time greatly exceed that of all preceding years.

The most common source of energy during modern times has been fossil fuels such as coal, petroleum and natural gas. We are using these fuels so much faster than they can be produced that we are now experiencing an energy shortage which can only be expected to worsen if we continue to rely solely on fossil fuels for our energy needs. Thus there is a great current interest in developing other sources of energy. By the same token it has recently become evident that the burning of fossil fuels is ecologically harmful, and this has brought about a search for "cleaner" sources of energy. Finally, since the amount of petroleum presently available is limited and since petroleum is of great value in the production of numerous products, including the various synthetics and even certain valuable drugs, many experts consider the burning of petroleum for fuel a waste of this resource.

One alternate energy source currently receiving a great deal of attention is that of nuclear power. However, many experts object to this alternative as being expensive as well as extremely dangerous in several respects too detailed to elaborate here. Suffice it to say that nuclear power is neither the perfect nor the sole solution to our present energy problems and the search for other solutions is continuing.

2. Description of the Prior Art

Natural energy, including direct radiation from the sun as well as winds, which are induced by the sun and other environmental factors, appears to be one of the best alternatives to the burning of fossil fuels. The use of such energy is inexpensive and is as free of harmful ecological impact as any other means presently available. Furthermore, the use of this natural energy does not entail the risks and dangers involved in the use of nuclear power.

Various systems have been devised for converting natural energy to useful kinetic or potential energy. Most of these have concentrated either on solar radiation or wind energy. My prior U.S. Pat. No. 3,832,853 discloses a system associated with a building or other edifice for non-interfering conversion of both solar radiation and wind energy to useful energy for use within the same building. The present invention pertains to improvements in this type of system; thus, the disclosure of U.S. Pat. No. 3,832,853 is hereby expressly incorporated herein by reference.

Briefly described, the system of my prior patent includes a plurality of wind driven wheels mounted adjacent the corners of the building. The system further comprises a double building wall of transparent material, air being free to circulate in the area between the two wall portions. A number of inclined slats are also located between the two wall portions to help absorb heat from the solar radiation striking the wall. The air between the walls is thus heated and rises to the top of the building where it is directed into a fan located on top of the building to rotate the fan. Both the rotating fan and the rotating wind wheels produce mechanical energy which may be used to drive a compressor to compress a gaseous medium. The gaseous medium, representing potential energy, is stored in the building for future use in driving pneumatic motors, etc.

One problem with the system disclosed in my prior patent is that, even though the heat absorbing slats are treated to make them substantially non-reflective, they cannot be made totally non-reflective and must, of necessity, reflect a portion of the radiation which strikes them. Much of this reflected radiation may be directed back away from the slat system and is not used to heat the air flowing upwardly along the building. Accordingly, one consideration in seeking to improve the prior system was to devise means for capturing and using an even greater part of the solar radiation available to a building.

Other objectives have included the reduction of unnecessary weight and expense by eliminating unnecessary parts and lightening necessary parts. It was also considered desirable to devise means for facilitating the air flow in the solar portion of the system so as to increase the volume as well as the velocity of the flowing air and to minimize turbulence. Another objective was to provide more efficient and reliable ways of using the energy made available by the wind and solar radiation conversion means.

SUMMARY OF THE INVENTION

The present invention involves several improvements in the system of my prior United States Patent described above. The system of the present invention is associated with a building or other edifice having a generally vertical outwardly facing side surface. Radiation absorbing means, which may comprise a plurality of louvers extending generally horizontally across the side surface, are disposed adjacent to but, at least in part, spaced from the side surface to define a flowway between the side surface and the radiation absorbing means. The louvers or other radiation absorbing means provide a plurality of generally upwardly facing radiation receiving surfaces each of which includes a plurality of hollows. The hollows allow a greater portion of the unabsorbed radiation reflected from one part of a radiation receiving surface to be reflected back against another part of the same radiation receiving surface and there absorbed. Thus, a greater part of the available solar radiation is used to heat the radiation absorbing means and thus the adjacent air. The heated air then begins to flow upwardly between the louvers and in the flowway and exercises a Venturi aspirating effect on the air outside the flowway. This effect is preferably facilitated by suitable formation of the hollows as corrugations running transverse to the louvers and also by suitable curving of the louvers.

It has also been discovered that the louvers need not be enclosed between the two portions of a double wall. Rather they can be located on the outside of an exterior wall of the building, which wall then provides the aforementioned side surface. This unenclosed louver arrangement not only does not reduce the effectiveness of the system, as might be expected, but actually facilitates air flow by eliminating interference and by allowing air to enter the system from between the louvers as well as from the bottom of the wall. This is in accord with one of the principal objectives of the invention which is to develop in the flowing air as great a velocity as possible. Furthermore, the elimination of the outer portion of the wall allows greater exposure of the radiation receiving surfaces to the sunlight, much of which would otherwise be reflected by the outer wall portion.

From the top of the flowway, the air is directed by a ducting apparatus to a rotor preferably located on the roof of the building. The rotor is preferably that of an impulse turbine which operates primarily by virtue of the velocity of the warm flowing air rather than by its expansion. The rotor includes blades each of which has both radial and tangential components of direction. The ducting apparatus, which is preferably arranged to allow the air to pick up additional heat and also to offer minimal resistance to the air flow, directs the air against the rotor blades. The rotor is rotatably mounted so as to be turned by the force of the air from the ducting apparatus striking the rotor blades. This rotation in turn drives, through suitable drive connections, at least a part of an energy-using first operator means such as a compressor. The rotor may have a central through-opening and means for creating a down-draft at the periphery thereof.

The preferred embodiment of the invention also includes wind driven energy conversion means including improved wind wheels comprising lightweight web members and low wind resistance bracing members. The energy imparted to the wind wheels is used to drive compressors. The resulting compressed air, representing potential energy, is stored in suitable storage columns within the building, which columns may also provide structural support for the building.

As mentioned above, the roof rotor may drive a number of different machines. These machines may include air conditioning compressors, refrigerant compressors, and an air compessor which, like those driven by the wind wheels, compresses air for storage in the above-mentioned columns. At such times as the roof rotor is not producing sufficient energy, the stored compressed air may be employed to drive, via suitable pneumatic motors and mechanical linkages, the air conditioning and refrigerant compressors or other machines ordinarily driven by the roof rotor. The stored compressed air is similarly used to ordinarily drive such machines as generators, which require a very constant energy input. Chimney columns may be provided in the building to direct warm air from various sources within the building to the roof rotor.

Accordingly it is a principal object of the present invention to provide an energy conversion system including radiation receiving surfaces having hollows to provide for utilization of a greater portion of the radiation available.

Still another object of the invention is to provide an energy conversion system in which unnecessary, expensive, and even inefficient covers for the louvers and roof rotor are eliminated.

A further object of the invention is to provide an improved solar radiation conversion means employing a flowing fluid as a motive force and having means to facilitate relatively high velocity flow of said fluid.

Yet another object of the invention is to provide an improved wind energy conversion means including wind wheels having lightweight web members and low wind resistance bracing members.

Still a further object of the invention is to provide a more efficient and dependable system for using energy produced by conversion of wind and/or solar radiation.

one more object of the present invention is to provide an auxiliary source of warm air to drive a roof rotor normally driven by sun-heated air.

Many more objects, features, and advantages of the present invention will be made apparent by the following description of the preferred embodiment, the drawings, and the claims.

DESCRIPTION OF THE PREFERRED EMBODIMENTS

Figures 1, 4, 5:
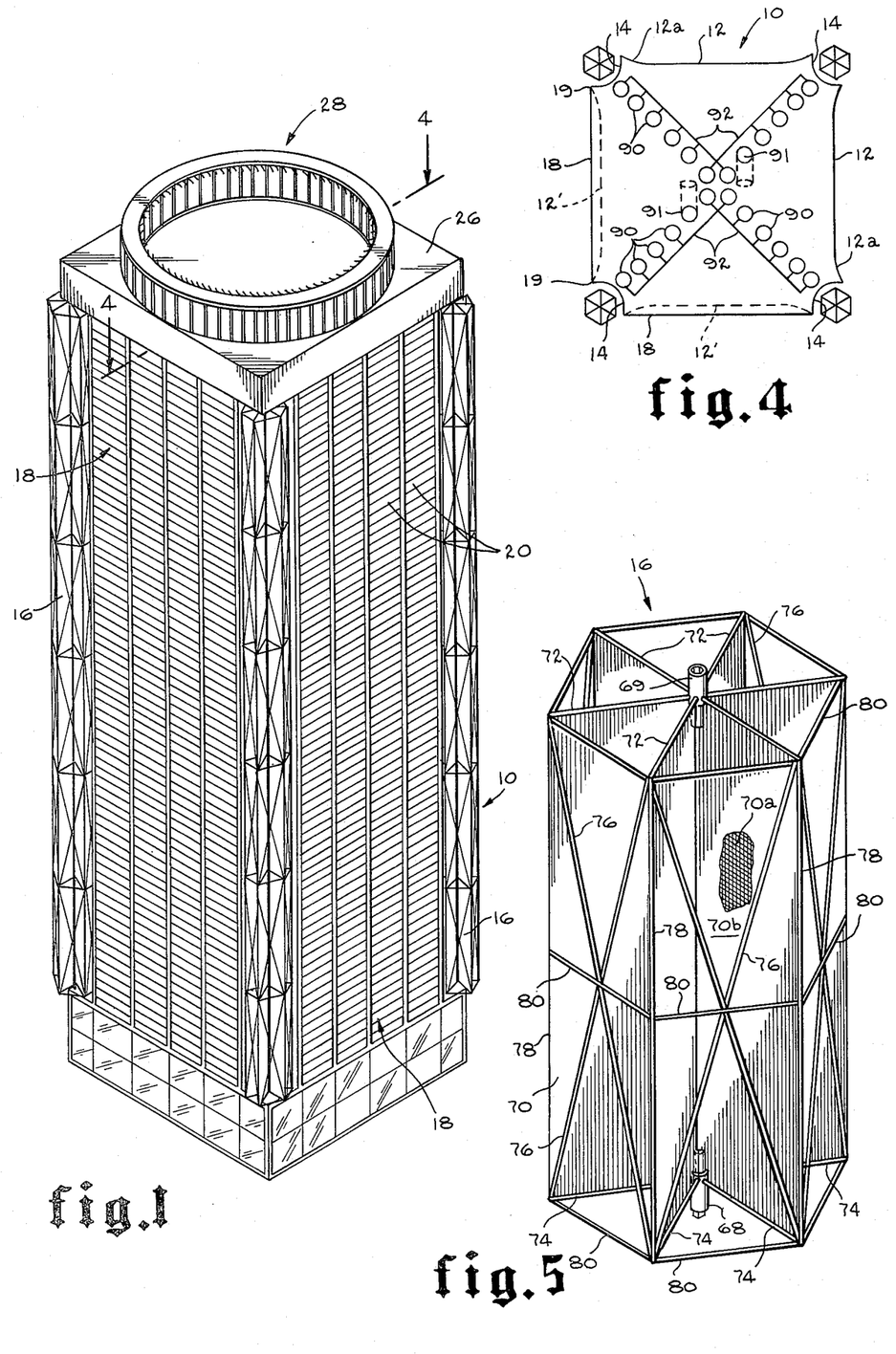
FIG. 1 is a perspective view of a building incorporating the energy conversion system of the present invention.
FIG. 4 is a diagrammatic cross-sectional view of the building taken on lines 4—4 in FIG. 1.
FIG. 5 is a detailed perspective view of one of the improved wind wheels of the invention.

Referring now to FIGS. 1 and 4, there is shown a building or edifice 10 with which the system of the present invention is associated. As shown, the edifice is a multi-story building such as a high-rise apartment building. However, it will be appreciated that the invention can be used with virtually any type of edifice desired. The building 10 includes four exterior walls 12 and 12' which are generally convergent to define four corners of the building. Vertically extending channels 14 are formed at these corners.

A vertically extending string of wind wheels 16 is suitably rotatably mounted on building 10 within each of the channels 14. The strings of wind wheels 16 comprise at least a portion of the wind driven energy conversion means of the system. Most rectangular buildings are arranged so that two of their four exterior walls, which may be either adjacent or opposite walls, receive a great deal of direct sunlight. In the embodiments shown, these are adjacent walls 12'. In accord with the present invention, radiation absorbing means 18 are mounted on the building adjacent each of the two walls 12'. As shown, the radiation absorbing means 18 each comprises a series of louvers 20 extending horizontally across their respective walls 12', the latter providing vertical outwardly facing side surfaces 22 (see FIGS. 6 and 7) of the building 10 for cooperation with the radiation absorbing means 18. The major portions of the louvers 20 are spaced from the side surfaces 22 of their respective walls 12' by perhaps about one meter (the distance being shown smaller for purposes of illustration) so as to define a flowway 24 between each surface 22 and its respective radiation absorbing means 18. Warm air heated by the solar radiation striking the louvers 20 rises in the flowways 24. As indicated in FIG. 4, the walls 12' flare outwardly near the corners of the building to meet the radiation means 18 as indicated at 19. This prevents substantial amounts of heated air from escaping along the building corners. As this air reaches the top of the building 10, it is collected by ducting apparatus 31 (shown in FIG. 3) which is enclosed in a housing 26 at the top of the building. The ducting apparatus in turn directs the warm air to a rotor 28, rotatably mounted on the roof of the building, so as to turn the rotor. The rotor in turn, via suitable drive connections, drives at least a part of an energy-using first operator means which may include one or more machines such as compressors. The louvers 20 with their cooperating flowways 24 and building side surfaces 22, the ducting apparatus 31, and the rotor 28 comprise the solar radiation conversion means of the system.

Figure 6:
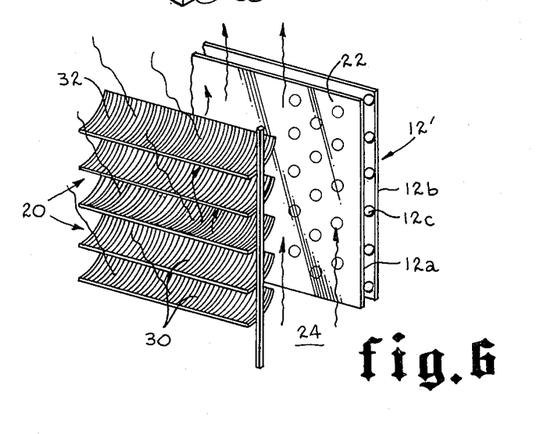
FIG. 6 is an enlarged detailed perspective view of some of the louvers of the invention and the adjacent wall of the building.
Figure 7:
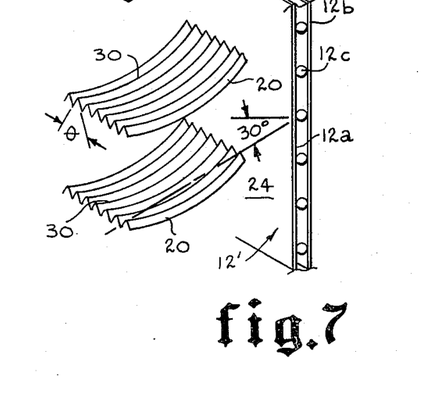
FIG. 7 is an even further enlarged side view of a portion of the apparatus of FIG. 6.

The various parts of the system will now be described in detail. Referring first to FIGS. 6 and 7, it will be seen that each of the louvers 20 is inclined downwardly and outwardly with respect to the adjacent side surface 22 of the building. Each louver 20 has a top face 30 which serves as a radiation receiving surface which is generally upwardly directed but which also has a vertical component of direction. The louvers 20, especially their upper faces 30, are substantially non-reflective; for example, they may be anodized black. Sun's rays thus strike the faces 30 and are primarily absorbed so that they heat the air between the louvers 20 and in the flowway 24. The heated air rises in the flowway 24 under a chimney-like effect.

Some of the solar radiation striking the surfaces 30 is, of necessity, not absorbed but reflected. To recapture at least a portion of this radiation, the louvers 20 are corrugated. The corrugations are quite small, their size having been exaggerated for purposes of illustration. They run transverse to the lengths of the louvers, so that the surfaces 30 each have a plurality of hollows or trenches 32 running in the general direction of warm air flow. Thus radiation which is reflected from one part of one of the surfaces 30 is allowed to strike another part of the same surface 30 so that some of it can be absorbed. It is presently believed that best results will be achieved if the angles $\theta$ formed by the corrugations are not substantially greater than 45°, and it is preferable that these angles be approximately 40°.

The louvers 20 are preferably inclined at about 30° with respect to the horizontal. This inclination allows sunlight to strike a great part of the surfaces 30 during most of the daylight hours, yet allows occupants of the building to see out between the louvers and keeps the building cool by preventing much direct sunlight from striking the building wall. Furthermore, the warm air rising in the flowway 24 exercises a Venturi aspirating effect on the air outside the flowway drawing it into the flowway. This effect is even further enhanced by the direction of corrugation of the louvers and also by the fact that the louvers are transversely curved so as to be slightly concave upwardly as shown in FIG. 7.

In order to avoid losing heat absorbed by the louvers to the building, the walls 12' are preferably insulated. A preferred manner of doing this is to construct the walls 12' of two parallel panels 12a and 12b spaced apart by spherical elements 12c and to provide a vacuum between the two panels 12a and 12b. Parts 12a, 12b and 12c may all be formed of glass or other transparent material. The spherical elements 12c brace the panels 12a and 12b so that a greater vacuum can be provided in the space between them.

Figure 3:
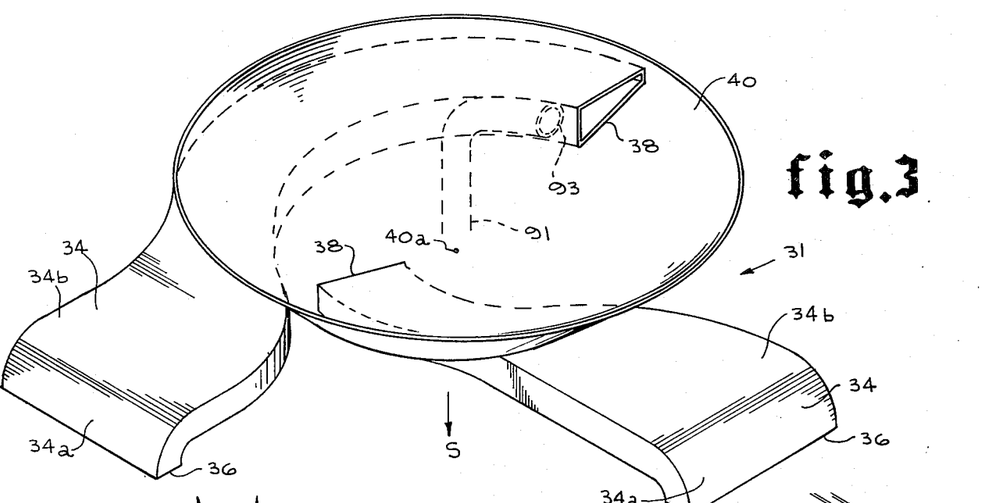
FIG. 3 is a detailed perspective view of the ducting apparatus.

The velocity of the air rising in the flowways 24 is of great importance in the practice of the present invention. Accordingly, the ducting apparatus 31 is designed to afford minimal resistance to this air flow. As shown in FIG. 3, the ducting apparatus 31 comprises two duct elements 34 intersecting a shallow open topped conical member 40 defining a chamber of like configuration. Each of the duct elements 34 forms a passageway having a downwardly directed inlet 36 for receiving air from a respective one of the flowways 24 and an outlet 38 for directing this air generally horizontally against the sides of the conical chamber formed by member 40. It will be appreciated that the duct elements 34 must effect a substantial change in the direction of flow of the air. They are constructed, as shown, to effect this change through smooth shallow curves and left-hand spiraling which offer minimal resistance to the air flow and cooperate with the preferred direction of rotor rotation. They are also curved so that their outlets 38 are disposed on opposite sides of the member 40 and direct their air in opposite directions without the two ducts interfering with each other.

Each of the ducts 34 preferably has a lower portion 34a which is formed of tinted glass to provide windows for an upper story of the building. The glass is preferably an insulating type such as illustrated in FIG. 6 for wall 12'. The remainder 34b of the ducts may be of any suitable material such as aluminum and the lower wall of portion 34b is preferably insulated.

Figure 2:
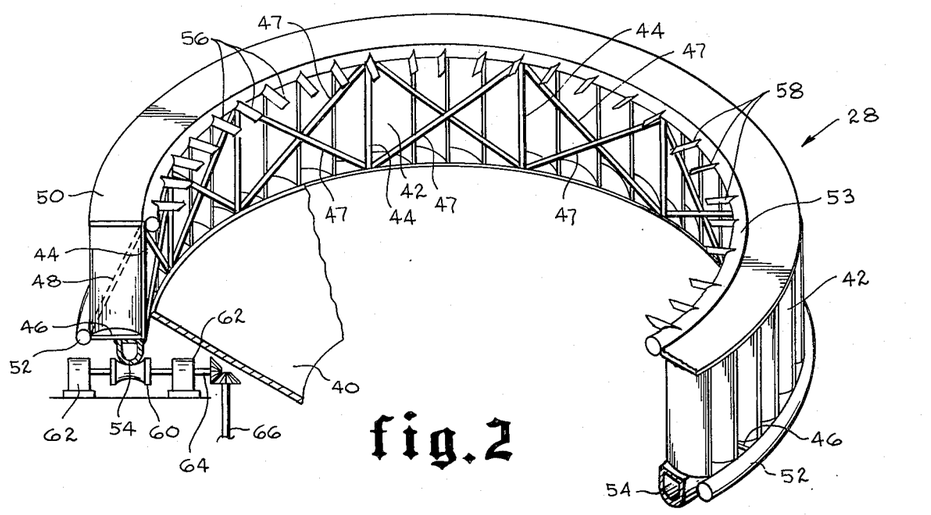
FIG. 2 is a detailed perspective view, partly broken away, of the roof rotor and associated parts.

The upper edge of conical member 40 rests adjacent the lower edge of the rotor 28 at the inner edge of rotor blades 42 as shown in FIG. 2 and is of comparable diameter. Rotor 28 has a central axial through opening. Thus the inner surface of member 40 is exposed to sunlight. This inner surface is treated so as to be substantially nonreflective. Thus the air passing through ducts 34 picks up heat as it passes under member 40 and then acquires additional heat as it passes over the inner surface of member 40 after being discharged from the ducts. Member 40 may be an asymmetrical cone having a lower apex 40a which is displaced in one compass direction, in this case south as indicated by the arrow S, to provide more efficient air flow for the placement and direction of spiraling of the ducts and the cooperative direction of rotation of the rotor 28.

Turning now to FIGS. 1 and 2, it is noted that the height of the rotor 28 has been exaggerated for purposes of illustration. It will be seen that rotor 28 has a number of vertical curved blades 42 each of which has a radial component of direction and a tangential component of direction. Air discharged from the ducts 34 flows upwardly along the interior of member 40 and against the blades 42 causing the rotor to turn. At times this rotation may be augmented by wind striking the rotor blades 42 from the exterior of the rotor. In addition to the blades 42, the rotor 28 comprises an upper ring 53, a lower outer ring 52, and an annular lower inner rail 54. Each of the blades 42 is attached to the upper ring 53 at its upper radially innermost corner, to the lower outer ring 52 at its lower radially outermost corner, and to the rail 54 at its lower raidally innermost corner. In some instances, the blades 42 may be sufficient to brace the rings 52 and 53 and rail 54 and maintain proper spacing thereof. However, in the preferred embodiment shown, the blades 42 are made as thin and lightweight as possible, and the rings 52 and 53 and rail 54 are braced against one another by vertical bars 44, horizontal bars 46, and diagonal bars 48 which form a series of vertical triangles symmetrically circumferentially spaced about the rotor. The rotor may be further braced by crossed diagonal braces 47 disposed along the inner periphery of the rotor. As shown, the upper ring 53 and rail 54 are connected by the vertical bars 44 and diagonal braces 47; the upper ring 53 and lower outer ring 52 are connected by diagonal bars 48; and the lower outer ring 52 and rail 54 are connected by horizontal bars 46. An annular cover 50 is connected to the upper ring 53 and extends across the upper edges of the blades 42.

A plurality of fins 58 are mounted on the cover 50 to project generally radially inwardly from the blades 42. The fins 58 are generally horizontal, but their trailing edges are inclined slightly downwardly (about 30°) as shown. The fins 58 create a down-draft as the rotor turns which helps to prevent an excessive amount of the air from ducts 34 from escaping through the top of the central axial throughway in the rotor. It would also be possible to cover the entire top of the rotor to prevent such escape. However, since the rotor 28 is of the impulse turbine type, which operates primarily by virtue of the velocity of air rather than by its expansion, such a cover might do little more than add unnecessary weight to the rotor.

Four sheave members 60 (one of which is shown in FIG. 2), whose axes extend in a radial direction with respect to the rotor 28, are rotatably mounted on the roof of the building 10 via bearings 62. Rail 54 rests on the sheaves 60 to rotatably mount the rotor 28. The rail 54 may turn the sheaves simply by friction or it may be geared to them. Each sheave 60 is connected to a horizontal shaft 64 which is in turn geared to a vertical shaft 66. Each shaft 66 drives an appropriate part of the energy-using first operator means to be described more fully below. A shield (not shown) to protect the rotor 28 from hail, rain, snow, etc. may be mounted on the roof of building 10 in spaced relation to the rotor so as not to interfere with proper air flow.

Turning now to FIG. 5, there is shown one of the improved wind wheels 16. The wheel 16 comprises a pair of stub shafts 68 and 69 coincident with the rotational axis of the wheel. Coplanar with and extending radially from the axis of the wheel are a plurality of vertical webs 70. Each web 70 comprises a sheet of netting or other material of high tensile strength which is preferably perforated to make it lightweight. Each side of the netting is covered by a sheet of substantially imporous material such as metal foil, plastic film, etc. Thus each web 70 is extremely lightweight and may even be flexible, yet, if supported by suitable bracing member, its tensile strength allows it to catch the wind and cause the wheel 16 to rotate.

The shafts 68 and 69 are each attached to the radially inner edge of each of the webs 70 which may also be suitably attached to each other at the radially inner edges intermediate the stub shafts 68 and 69. A number of upper bracing spokes 72, each of which is connected to the upper edge of a respective one of the webs 70, extend radially from upper stub shaft 69. Similarly, a number of lower bracing spokes 74 extend radially from the lower stub shaft 68, and each is connected to the lower edge of a respective one of the webs 70. Each web is further supported by a vertical strut 78 extending along and connected to its radially outer edge and also connecting its upper and lower bracing spokes. A pair of crossed diagonal bracing struts 76 are provided between each two adjacent web members. Each strut 76 extends diagonally from the outer end of the upper bracing spoke 72 of one web 70 to the outer end of the lower bracing spoke 74 of an adjacent web 70. Alternatively, a plurality of pairs of vertically aligned crossed bracing struts may be provided between each two adjacent webs 70 interconnecting their respective vertical struts 78 at several locations. Horizontal struts 80 connect the various other bracing members together around the periphery of the wheel. One set of horizontal struts 80 is located about the outer ends of the upper bracing spokes 72, one set about the outer ends of the lower bracing spokes 74, and one set midway along the length of the wheel. Each of the bracking members is in the form of a thin preferably hollow rod which thus offers minimal resistance to the wind and is lightweight. Thus they do not interfere with the action of the webs. The various bracing members are also preferably of lightweight but strong material. It will be appreciated that the improved wind wheel structure will allow more of the wind energy to be converted into useful energy since the lightweight wheels are more easily turned by the wind.

As mentioned above, a string of wheels 16, suitably connected end-to-end for joint rotation as by hexagonal box and pin connections or the like, is rotatably mounted in each of the channels 14 at the corners of the building 10. Each string is drivingly connected to an appropriate part of the energy-using operator means. The drive connection can be any known type operative to rotate the driven shaft in a constant direction regardless of the direction of rotation of wheels 16 and will be referred to herein as a unidirection drive connection. As shown in FIG. 4, the building walls 12 and 12' gradually flare outwardly adjacent the corner channels 14. This tends to direct the wind or air currents flowing across the building walls smoothly against the webs 70, and, in the case of walls 12', to close the sides of flow-ways 24 as mentioned above.

Figure 8:
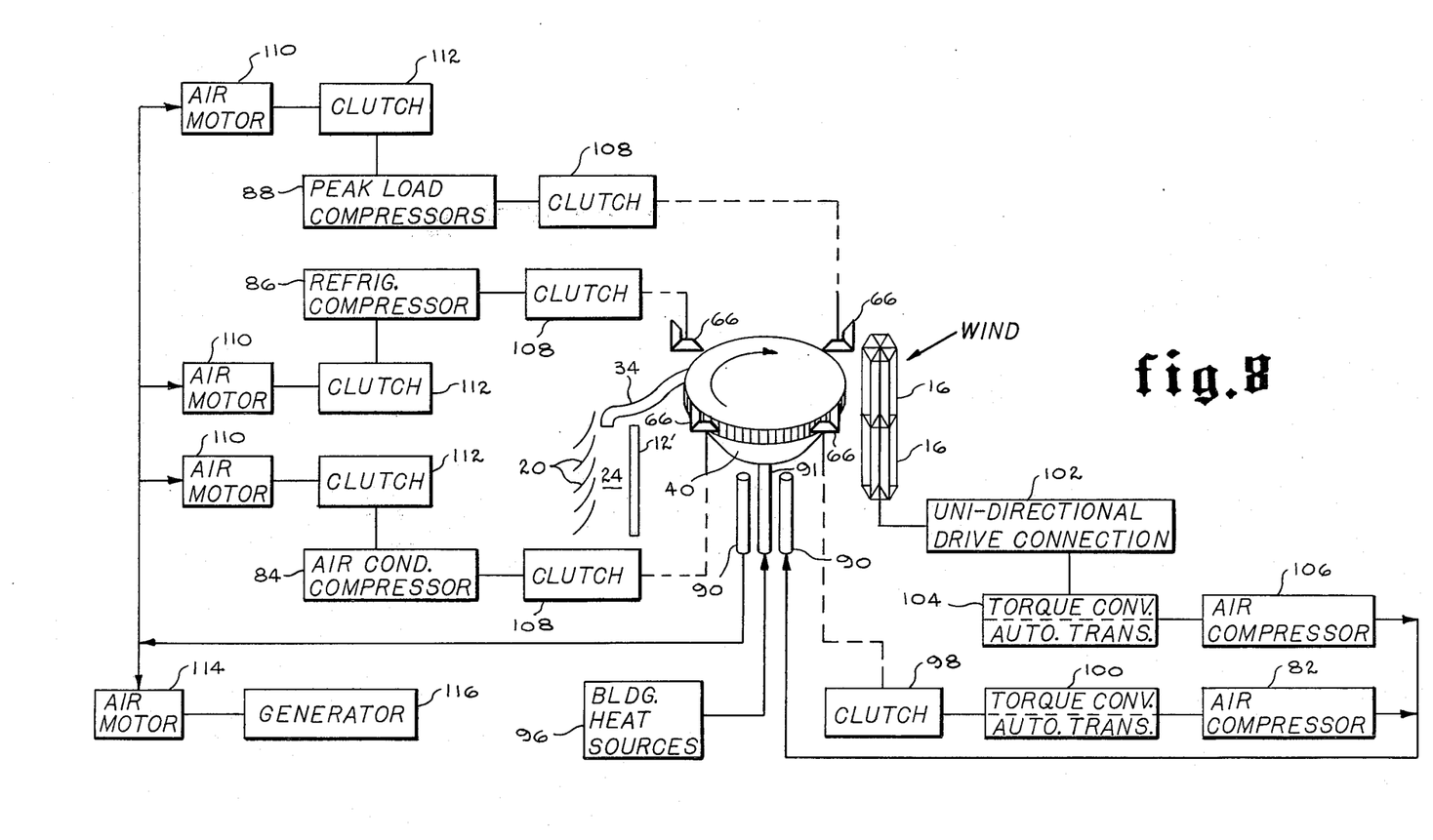
FIG. 8 is a simplified flow diagram of the system of the present invention.

Referring now to FIG. 8, there is shown a flow diagram of the overall system. The system includes four shafts 66 driven by the rotor 28 as well as four wind wheel strings, only one of which is shown. The first operator means of the system includes four basic parts: an air compressor 82 for air to be stored in the building, an air conditioning compressor 84, a refrigerant compressor 86 for the refrigerators in the various apartments in the building, and auxiliary air conditioning and refrigerant compressors 88 for peak load periods. Each of the shafts 66 is drivingly connectible with a respective one of the four operator parts 82, 84, 86, and 88.

Referring first to the air compressor 82, it is noted that this compressor is used to compress air, or any other suitable gaseous medium for storage within the building, the stored air affording potential energy available for future use. In particular, the compressed air is directed from compressor 82 to vertical support columns 90 arranged throughout the building as seen in FIG. 4 by suitable conduits. The columns serve the double function of providing receptacles for air under pressure and of providing structural support for the building. Accordingly, they must be suitably sealed and provided with sufficient longitudinal and transverse strength to serve these functions. The various columns may be connected by lateral connection tubes, 92 (see FIG. 4). The lateral tubes 92 contain valves or other suitable means for selectively opening and closing the connected columns from communication with each other. Two chimney columns 91 are provided near the center of the building. They may be lighter than support columns 90 and their upper ends are open and extend up into the ducting apparatus 31. The ends then curve through roughly 90° to form generally horizontal outlets 93 coincident with respective ones of the outlets 38 of the ducts 34 (see FIG. 3). Columns 91 can thus provide auxiliary driving air for the rotor 28 from other sources of warm air sources 96 may include furnaces, whose fuels may include wastes produced by occupants of the building, as well as means for channeling "waste heat" produced by various appliances, lights, greenhouses, etc. in the building into the columns 91. As shown, the chimney columns 91 are independent of the storage columns 90. However, it may be desirable in some instance to provide lateral lines equipped with valves to selectively connect the support columns to the chimney columns so that, for example, the latter may be used for storage. In such a case the chimney columns would be of heavy duty construction similar to that of the support columns and their upper ends selectively sealable by suitable closure means.

Referring again to FIG. 8, it will be seen that one of the shafts 66 is connectible via clutch 98 and torque converter-automatic transmission 100 with air compressor 82 to drive the latter. The automatic transmission 100 will allow operative connection between its respective shaft 66 and the compressor 82 only when the amount of energy being provided by the rotor 28 exceeds the requirements of the other machines being driven thereby. These machines 84, 86, and 88 are each operably connectible via a respective clutch 108 with a respective one of the shafts 66. The clutch 108 for the peak load compressor 88 is engaged only when compressors 84 and 86 are not supplying the needs of the building due to exceptionally high demands.

It will be appreciated that, because the rotor 28 can be driven by either solar radiation, wind, and/or warm air from sources 96 and because at least one of these factors is usually available at any given time, the machines 84, 86, and 88 can normally be driven by the rotor 28. However, for those occasions when the rotor 28 is not producing sufficient usable energy, the machines 84, 86, and 88 can be operably connected by respective clutches 112 with respective pneumatic turbines or air motors 110. Motors 110 are driven by the compressed air directed thereto from columns 90 by suitable conduits. Other machines such as generator 116 can also be driven by this compressed air via a similar air motor 114 supplied with compressed air by a conduit from columns 90.

The wind wheels 16 also produce usuable energy which may, if desired, be directly channeled to any suitable machine. However, since the energy output of the wind wheels is relatively sporadic, it is preferable that it be used solely to compress air for the storage columns 90. Accordingly, each of the four strings of wind wheels 16 (only one of which is shown in FIG. 8) is connected by a uni-directional drive connection 102 and a torque converter-automatic transmission 104 to a respective air compressor 106, the output of which is directed to the storage columns 90 by suitable conduits. The compressors 106 comprise the second operator means of the system.

It will be readily appreciated that the system described above has numerous advantages. It provides for efficient use of the available natural energy by the non-interfering use of both solar radiation and wind. While much of the available natural energy is used immediately, the system also converts a substantial amount of the natural energy to potential energy for use in normally driving certain machines and for occasionally driving other machines during periods when the wind and solar radiation available is not sufficient.

It will also be appreciated that many modifications of the system can be made without departing from the scope of the invention. For example, while four of the shafts 66 and four wind wheel strings have been illustrated in the sample system, any number could be used. Similarly, numerous changes could be made in the manner of using the converted energy as illustrated in FIG. 8. The nature and number of the machines operated by the various energy sources could be varied, and the number of different energy sources connectible with any given machine could also be varied. Furthermore, many structural changes could be made in the energy conversion apparatus itself. Accordingly, it is intended that the scope of the invention be limited only by the claims which follow.

I claim:

1. An energy conversion system associated with an edifice having a generally vertical outwardly facing side surface, said system comprising:
   radiation absorbing means defining a plurality of radiation receiving surfaces adjacent to said side surface but spaced from at least a major portion of said side surface of said edifice to define a flowway between said side surface and said radiation absorbing means and containing a first gaseous medium, each of said radiation receiving surfaces facing generally upwardly and each having a plurality of hollows;
   a rotor rotatably mounted on said edifice above said radiation receiving surfaces and comprising a plurality of blades each having a radial component of direction and a tangential component of direction;
   ducting apparatus carried by said edifice and disposed to direct said first gaseous medium from said flowway to said rotor blades to rotate said rotor; and
   energy-using first operator means at least a part of which is driven by rotation of said rotor.

2. The system of claim 1 wherein said fluid medium flows across said radiation receiving surfaces to said flowway and wherein said hollows are elongated in the general direction of flow of said fluid medium across said radiation receiving surfaces.

3. The system of claim 1 wherein said radiation absorbing means comprises a plurality of generally parallel, vertically spaced louver elements each extending generally horizontally across said side surface of said edifice.

4. The system of claim 3 wherein said louver elements have corrugated uppermost faces forming said radiation receiving surfaces, the corrugations of said uppermost faces extending generally transverse to the length of said louver elements and defining said hollows.

5. The system of claim 4 wherein the corrugations of said uppermost faces from angles not substantially greater than 45° between adjacent portions of said radiation receiving surfaces.

6. The system of claim 3 wherein said louver elements are curved transverse to their lengths so as to be concave upwardly.

7. The system of claim 1 wherein said side surface of said edifice comprises an exterior wall of said edifice, said radiation absorbing means being located outside said edifice and said first gaseous medium being air.

8. The system of claim 7 wherein said wall comprises a pair of parallel spaced apart panels and a plurality of spacing members located between said panels, the area between said panels being in vacuum.

9. The system of claim 8 wherein said panels are transparent and said spacing members are transparent spheres.

10. The system of claim 7 wherein said wall has two corner edges, said wall being flared outwardly adjacent said corner edges so that said corner edges are disposed closely adjacent said radiation absorbing means.

11. The system of claim 1 wherein said ducting apparatus comprises means defining an upwardly and outwardly flaring open-topped chamber disposed beneath and communicating with said rotor, and a duct element having a passageway therethrough and also having an inlet communicating with said flowway and an outlet communicating with said chamber and disposed to direct said first gaseous medium against the inner surface of said chamber.

12. The system of claim 11 wherein said edifice comprises two of said side surfaces, and further comprising two of said radiation absorbing means each disposed adjacent a respective one of said surfaces to form a respective one of said flowways, and two of said duct elements each having its inlet communicating with a respective one of said flowways, said duct elements having their outlets disposed in generally opposite directions in said chamber and said duct elements being curved so as to be non-interfering.

13. The system of claim 1 wherein said rotor comprises an annular lower rail member, said system further comprising a plurality of sheave members rotatably mounted on said edifice, said rail member resting on said sheave members to support said rotor on said sheave members and to rotate said sheave members by rotation of said rotor, and drive connection means rotatably driven by said sheave members and operatively connected to said first operator means.

14. The system of claim 1 wherein said edifice comprises at least one substantially vertical hollow edifice support column, wherein said first operator means includes a compressor for compressing a second gaseous medium and further comprising means for directing the compressed gaseous medium from said compressor to said support column for storage.

15. The system of claim 14 further comprising a substantially vertical chimney column communicable with said ducting apparatus and a secondary source of a third warm gaseous medium communicatively connected to said chimney column.

16. The system of claim 14 further comprising a plurality of said support columns and a series of lateral connection tubes interconnecting the interiors of various ones of said support columns and closure means for selectively opening and closing said connection tubes.

17. The system of claim 14 wherein said first operator means includes at least one machine, and further comprising a gas operated engine, means for selectively directing said second gaseous medium from said support column to said engine, and means for independently operably connecting said machine to said engine or to said rotor.

18. The system of claim 1 wherein said rotor has a central through-opening adjacent said rotor blades.

19. The system of claim 18 including means adjacent the top of said rotor for creating a down-draft within said rotor near its inner periphery.

20. The system of claim 19 wherein said draft creating means comprises a plurality of generally parallel fins mounted on the top of said rotor and extending generally radially inwardly of said rotor blades, said fins being downwardly and rearwardly inclined with respect to the direction of rotation of said rotor.

21. The system of claim 1 wherein said rotor blades have radially outer portions exposed to winds in the area of said edifice.

22. The system of claim 1 further comprising wind driven means rotatably supported adjacent the exterior of said edifice and second operator means operably connected to said wind driven means.

23. The system of claim 22 wherein said edifice comprises at least one substantially vertical hollow edifice support column, wherein said second operator means includes a compressor for compressing a second gaseous medium and further comprising means for directing the compressed gaseous medium from said compressor to said support column for storage.

24. The system of claim 22 wherein said wind driven means comprises a wind wheel having an axis of rotation and including a plurality of web members each coplanar with and radiating from said axis of rotation and each having an upper edge, a lower edge, and radially inner and outer edges, and a plurality of low wind resistance bracing members connected to the edges of said web members to support said web members.

25. The system of claim 24 wherein said bracing members are in the form of narrow rods.

26. The system of claim 24 wherein said bracing members include a first stub shaft coaxial with said axis of rotation and connected to the upper portions of the radially inner edges of said web members, upper bracing spokes extending radially from said first stub shaft and each extending along and attached to the upper edge of a respective one of said web members, a second stub shaft coaxial with said axis of rotation and connected to the lower portions of the radially inner edges of said web members, lower bracing spokes extending radially from said second stub shaft and each extending along and attached to the lower edge of a respective one of said web members, and means rigidly interconnecting said upper and lower bracing spokes.

27. The system of claim 26 wherein said bracing members further comprise a pair of crossed diagonal bracing struts between each two adjacent web members, each of said diagonal bracing struts extending from the upper bracing spoke of one of said web members to the lower bracing spoke of the adjacent web member.

28. The system of claim 26 wherein said bracing members further comprise a plurality of vertical struts each extending from the radially outer portion of the upper bracing spoke to the radially outer portion of the lower bracing spoke of a respective one of said web members and connected to the radially outer edge of said respective web member, and means connecting adjacent ones of said vertical struts.

29. The system of claim 24 wherein said edifice comprises a corner bounded by two generally convergent outer walls, wherein said edifice has a vertical channel at said corner, said wind wheel being disposed in said channel, and wherein said convergent walls flare outwardly adjacent said channel.

30. The system of claim 24 wherein said edifice comprises a plurality of corners and further comprising a generally vertical string of said wind wheels disposed adjacent each of said corners, each of said strings having its wind wheels connected in end-to-end relation for joint rotation.

31. The system of claim 24 wherein each of said web members comprises a sheet of perforated material of high tensile strength covered on each side with a sheet of substantially imporous material.

32. The system of claim 24 wherein said radiation absorbing means and said rotor are substantially unenclosed.

33. The system of claim 24 wherein each of said operators comprises a respective compressor for compressing a second gaseous medium, and wherein said edifice comprises storage means for said second gaseous medium, said system further comprising a machine communicatively connected with said storage means and driven by expansion of said compressed gaseous medium.

* * * * *

UNITED STATES PATENT AND TRADEMARK OFFICE
CERTIFICATE OF CORRECTION

PATENT NO. : 4,004,427
DATED : 1/25/77
INVENTOR(S) : Tony W. Butler, Jr.

It is certified that error appears in the above-identified patent and that said Letters Patent are hereby corrected as shown below:

In column 5, line 5, after the word "radiation" insert --absorbing--;

In column 8, line 17, delete the word "bracking" and insert therefor --bracing--;

In column 9, line 13, delete the word "sources" (second occurrence);

In column 9, line 13, after "96" insert --within the building. The other warm air sources 96--;

In column 9, line 20, delete the word "instance" and insert therefor --instances--.

In the Claims

Claim 5, line 66, delete "from" and insert therefor --form--;

Claim 12, line 31, after the word "said" insert --side--.

Signed and Sealed this

Fourteenth Day of June 1977

[SEAL]

Attest:

RUTH C. MASON
*Attesting Officer*

C. MARSHALL DANN
*Commissioner of Patents and Trademarks*